United States Patent
Watanabe et al.

(10) Patent No.: US 8,731,316 B2
(45) Date of Patent: May 20, 2014

(54) INFORMATION PROCESSING APPARATUS AND METHOD, IMAGE PROVIDING SYSTEM AND IMAGE PROVIDING METHOD, AND PROGRAM FOR REDUCING QUALITY DETERIORATION OF AN IMAGE

(75) Inventors: Shinji Watanabe, Tokyo (JP); Tsuneo Hayashi, Chiba (JP); Masahito Yamane, Kanagawa (JP); Takeshi Uemori, Tokyo (JP)

(73) Assignee: Sony Corporation, Tokyo (JP)

( * ) Notice: Subject to any disclaimer, the term of this patent is extended or adjusted under 35 U.S.C. 154(b) by 145 days.

(21) Appl. No.: 13/423,655

(22) Filed: Mar. 19, 2012

(65) Prior Publication Data

US 2012/0251014 A1 Oct. 4, 2012

(30) Foreign Application Priority Data

Mar. 29, 2011 (JP) ................................. 2011-072379

(51) Int. Cl.
*G06K 9/36* (2006.01)
*G06K 9/46* (2006.01)

(52) U.S. Cl.
USPC ........................................................ 382/248

(58) Field of Classification Search
USPC ................. 382/232, 233, 236, 248, 250–251; 375/240.03, 240.1, 240.14, 240.2, 375/240.23
See application file for complete search history.

(56) References Cited

U.S. PATENT DOCUMENTS

| | | | | | |
|---|---|---|---|---|---|
| 5,355,167 | A | * | 10/1994 | Juri | 375/240.03 |
| 5,369,439 | A | * | 11/1994 | Matsuda et al. | 375/240.2 |
| 5,442,399 | A | * | 8/1995 | Asamura et al. | 375/240.01 |
| 5,485,533 | A | * | 1/1996 | Hatano et al. | 382/236 |
| 5,959,672 | A | * | 9/1999 | Sasaki | 375/240.23 |
| 6,185,312 | B1 | * | 2/2001 | Nakamura et al. | 382/100 |
| 2012/0251014 | A1 | * | 10/2012 | Watanabe et al. | 382/233 |

FOREIGN PATENT DOCUMENTS

JP 2010-172001 A 8/2010

* cited by examiner

*Primary Examiner* — Amir Alavi
(74) *Attorney, Agent, or Firm* — Sony Corporation (57) ABSTRACT

An information processing apparatus includes a two-dimensional orthogonal transform coding data acquisition unit for sequentially acquiring two-dimensional orthogonal transform coding data acquired by transforming three-dimensional orthogonal transform coding data generated from a plurality of images, a two-dimensional orthogonal transform coefficient data generation unit for generating a plurality of pieces of two-dimensional orthogonal transform coefficient data using the plurality of pieces of acquired two-dimensional orthogonal transform coding data, and a three-dimensional transformation unit for encoding three-dimensional orthogonal transform coefficient data acquired by transforming the plurality of pieces of generated two-dimensional orthogonal transform coefficient data.

14 Claims, 9 Drawing Sheets

INFORMATION PROCESSING APPARATUS AND METHOD, IMAGE PROVIDING SYSTEM AND IMAGE PROVIDING METHOD, AND PROGRAM FOR REDUCING QUALITY DETERIORATION OF AN IMAGE

BACKGROUND

The present disclosure relates to an information processing apparatus and a method for use therewith, an image providing system and an image providing method, and a program. More particularly, the present disclosure relates to an information processing apparatus capable of reducing image quality deterioration and a method for use therewith, an image providing system and an image providing method, and a program.

Various image providing systems for providing image data stored in a server to a client terminal device have been proposed.

For example, Japanese Unexamined Patent Application Publication No. 2010-172001 proposes a system for performing predetermined image processing such that requirements such as an image quality and a format specified by a client terminal device are satisfied at the side of a server, and then providing image data acquired by the processing.

SUMMARY

However, in the above-mentioned technology, the image data on which the predetermined image processing has been performed is provided to the client terminal device. Consequently, the provided image data is deteriorated.

To solve the problem, it is preferable that image data having equivalent image quality to the server side is to be provided to the client terminal device.

The present disclosure has been made in view of the above, and the present disclosure is directed to enable to reduce deterioration in image quality of image data provided from a server to a client terminal device.

According to an embodiment of the present disclosure, an information processing apparatus is provided. The information processing apparatus includes a two-dimensional orthogonal transform coding data acquisition unit for sequentially acquiring two-dimensional orthogonal transform coding data acquired by transforming three-dimensional orthogonal transform coding data generated from a plurality of images, a two-dimensional orthogonal transform coefficient data generation unit for generating a plurality of pieces of two-dimensional orthogonal transform coefficient data using the plurality of pieces of acquired two-dimensional orthogonal transform coding data, and a three-dimensional transformation unit for encoding three-dimensional orthogonal transform coefficient data acquired by transforming the plurality of pieces of generated two-dimensional orthogonal transform coefficient data.

In the specification, the term "2D" means "two dimensional", and the term "3D" means "three-dimensional".

The information processing apparatus further includes a 2D orthogonal transform coefficient data rearrangement unit for sorting the plurality of pieces of generated 2D orthogonal transform coefficient data in a predetermined order. The 3D transformation unit transforms the plurality of pieces of sorted 2D orthogonal transform coefficient data into the 3D orthogonal transform coefficient data.

The 2D orthogonal transform coefficient data rearrangement unit sorts the plurality of pieces of 2D orthogonal transform coefficient data into the same order as the arrangement order of the plurality of images.

The 3D transformation unit encodes the 3D orthogonal transform coefficient data using a quantization parameter.

The quantization parameter is a quantization value used in generating the 3D orthogonal transform coding data from the plurality of images, or a quantization value corresponding to a capacity necessary for storing the 3D orthogonal transform coding data acquired by encoding the 3D orthogonal transform coefficient data.

The information processing apparatus further includes an image request unit for requesting an image. The 2D orthogonal transform coding data acquisition unit sequentially acquires the 2D orthogonal transform coding data containing an image corresponding to the request, and other 2D orthogonal transform coding data on the periphery of the image.

The 2D orthogonal transform coefficient data generation unit includes a 2D orthogonal transform coding data decoding unit for decoding each of the plurality of pieces of acquired 2D orthogonal transform coding data, and an inverse quantization unit for performing inverse quantization processing on the decoded 2D orthogonal transform coding data. The 2D orthogonal transform coefficient data rearrangement unit sorts the plurality of pieces of 2D orthogonal transform coefficient data acquired by the inverse quantization processing.

The 3D transformation unit further includes a 3D orthogonal transform coefficient data transformation unit for performing one-dimensional orthogonal transformation on the sorted 2D orthogonal transform coefficient data in the direction the plurality of images are arranged, and transforming the data into 3D orthogonal transform coefficient data, a quantization unit for quantizing the transformed 3D orthogonal transform coefficient data, and a 3D orthogonal transform coefficient data encoding unit for encoding the 3D orthogonal transform coefficient data acquired by the quantization.

The information processing apparatus further includes a 3D orthogonal transform coding data storage unit for storing 3D orthogonal transform coding data acquired by encoding the 3D orthogonal transform coefficient data, and a 3D decoding unit for decoding the stored 3D orthogonal transform coding data.

The information processing apparatus further includes a 2D inverse orthogonal transformation unit for performing inverse orthogonal transformation processing on the 2D orthogonal transform coefficient data acquired by performing the inverse quantization processing on the decoded 2D orthogonal transform coding data.

An information processing method or a program according to an embodiment of the present disclosure is a method or a program corresponding to the above-described information processing apparatus according to an embodiment of the present disclosure.

The information processing apparatus, the method, and the program according to an embodiment of the present disclosure sequentially acquiring 2D orthogonal transform coding data acquired by transforming 3D orthogonal transform coding data generated from a plurality of images, generating a plurality of pieces of 2D orthogonal transform coefficient data using the plurality of pieces of acquired 2D orthogonal transform coding data, and encoding 3D orthogonal transform coefficient data acquired by transforming the plurality of pieces of generated 2D orthogonal transform coefficient data.

An image providing system according to an embodiment of the present disclosure includes an information processing apparatus, and an image providing apparatus for providing image data to the information processing apparatus. The image providing apparatus includes a 3D orthogonal transform coding data storage unit for storing 3D orthogonal transform coding data generated from a plurality of images, a reading unit for reading an image corresponding to a request from the information processing apparatus and 3D orthogonal transform coding data containing a peripheral image from the 3D orthogonal transform coding data stored in the 3D orthogonal transform coding data storage unit, a 2D orthogonal transform coding data transformation unit for transforming the read 3D orthogonal transform coding data into the 2D orthogonal transform coding data, and a 2D orthogonal transform coding data transmission unit for sequentially transmitting the transformed 2D orthogonal transform coding data and other 2D orthogonal transform coding data of the periphery of the image to the information processing apparatus. The information processing apparatus includes a 2D orthogonal transform coding data reception unit for sequentially receiving the 2D orthogonal transform coding data transmitted from the image providing apparatus, a 2D orthogonal transform coefficient data generation unit for generating a plurality of pieces of 2D orthogonal transform coefficient data using the plurality of pieces of acquired 2D orthogonal transform coding data, and a 3D transformation unit for encoding 3D orthogonal transform coefficient data acquired by transforming the plurality of pieces of generated 2D orthogonal transform coefficient data.

The information processing apparatus or the image providing apparatus may be an independent apparatus, or an internal block constituting an apparatus. The communication performed between the information processing apparatus and the image providing apparatus may be wireless communication or wired communication, and further, communication may include wireless communication and wired communication. That is, in a section, the wireless communication may be performed, and in the other sections, the wired communication may be performed.

An image providing method according to an embodiment of the present disclosure is a method corresponding to the above-described image providing system according to the embodiment of the present disclosure.

In an image providing apparatus and an image providing method according to an embodiment of the present disclosure, an image providing apparatus stores 3D orthogonal transform coding data generated from a plurality of images, the image providing apparatus reads 3D orthogonal transform coding data containing an image corresponding to a request from the information processing apparatus and 3D orthogonal transform coding data containing a peripheral image from a 3D orthogonal transform coding data storage unit storing 3D orthogonal transform coding data generated from the plurality of images, transforms the read 3D orthogonal transform coding data into the 2D orthogonal transform coding data, and sequentially transmits the transformed 2D orthogonal transform coding data and other 2D orthogonal transform coding data of the periphery of the image to the information processing apparatus. The information processing apparatus sequentially receives the 2D orthogonal transform coding data transmitted from the image providing apparatus, generates a plurality of pieces of 2D orthogonal transform coefficient data using the plurality of pieces of acquired 2D orthogonal transform coding data, and encodes 3D orthogonal transform coefficient data acquired by transforming the plurality of pieces of generated 2D orthogonal transform coefficient data.

According to an embodiment of the present disclosure, deterioration in image quality can be reduced.

DETAILED DESCRIPTION OF EMBODIMENTS

Hereinafter, embodiments of the present disclosure will be described with reference to the attached drawings.
<Configuration of Image Providing System>

Figure 1:
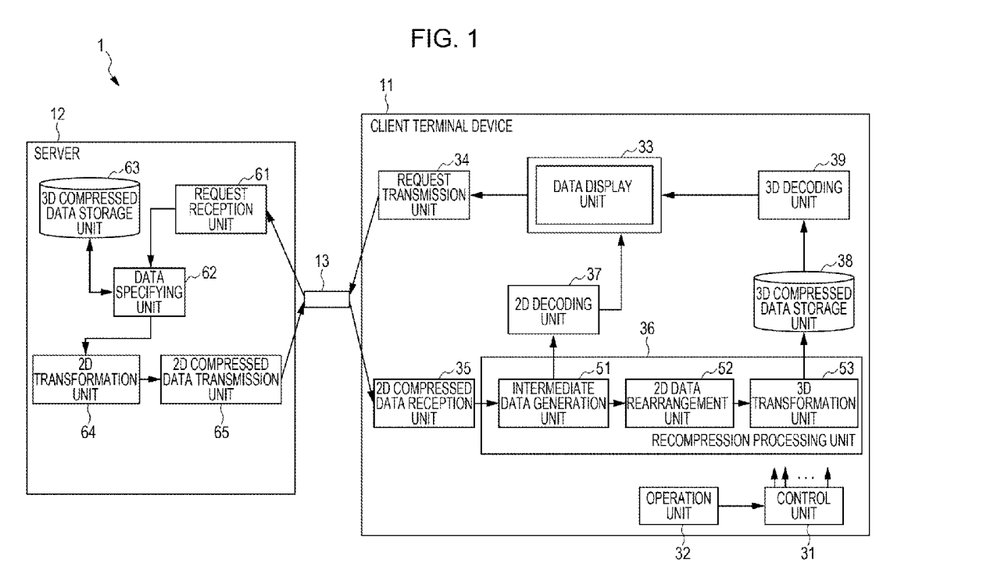
FIG. 1 illustrates a configuration of an image providing system.

FIG. 1 illustrates a configuration of an image providing system.

As illustrated in FIG. 1, an image providing system 1 includes a client terminal device 11 and a server 12. The client terminal device 11 and the server 12 can communicate with each other via a transmission path 13.

The client terminal device 11 requests an image corresponding to an instruction of a user to the server 12 via the transmission path 13. The client terminal device 11 receives the image provided in response to the request from the server 12 via the transmission path 13, and display the image.

The client terminal device 11 includes a control unit 31, an operation unit 32, a data display unit 33, a request transmission unit 34, a 2D (2D) compressed data reception unit 35, a recompression processing unit 36, a 2D decoding unit 37, a 3D (3D) compressed data storage unit 38, and a 3D decoding unit 39.

The control unit 31 controls operation of the individual units in the client terminal device 11. Further, the operation unit 32 controls operation of the individual units according to a signal corresponding to an instruction of the user supplied from the operation unit 32.

The data display unit 33 includes a monitor such as a liquid crystal display (LCD). The data display unit 33 displays an image such as a 2D image or a 3D image, and various types of information. Further, on the monitor, a touch panel can be superimposed. The data display unit 33 can receive an instruction from an external operation device such as a remote controller, and supply a signal corresponding to the instruction of the user to the request transmission unit 34. When an instruction relating to image display is issued by the user via the operation unit 32 or the touch panel, the data display unit 33 supplies a request of the image data corresponding to the instruction to the request transmission unit 34.

The request transmission unit 34 transmits the request of the image data supplied from the data display unit 33 to the server 12 via the transmission path 13.

The 2D compressed data reception unit 35 receives 2D compressed data transmitted from the server 12 via the transmission path 13, and supplies the data to the recompression processing unit 36.

The recompression processing unit 36 performs recompression processing on the 2D compressed data supplied from the 2D compressed data reception unit 35. The recompression processing unit 36 supplies 3D compressed data acquired by the recompression processing to the 3D compressed data storage unit 38. The 3D compressed data storage unit 38 stores the 3D compressed data. The recompression processing unit 36 supplies 2D transform coefficient data acquired in the middle of the recompression processing to the 2D decoding unit 37.

In the description below, 2D orthogonal transform coding data acquired by encoding processing with a 2D orthogonal transformation (for example, 2D discrete cosine transform (2D-DCT)) is referred to as 2D compressed data, and 3D orthogonal transform coding data acquired by encoding processing with a 3D orthogonal transformation (for example, 3D discrete cosine transform (3D-DCT)) is referred to as 3D compressed data.

Further, 2D orthogonal transform coefficient data acquired by performing a 2D orthogonal transformation (for example, 2D discrete cosine transform (2D-DCT)) on an image is referred to as 2D transform coefficient data, and 3D orthogonal transform coefficient data acquired by performing a 3D orthogonal transformation (for example, 3D discrete cosine transform (3D-DCT)) on pl images is referred to as 3D transform coefficient data.

The recompression processing unit 36 includes an intermediate data generation unit 51, a 2D data rearrangement unit 52, and a 3D transformation unit 53.

The intermediate data generation unit 51 performs decoding processing and inverse quantization processing on the 2D compressed data supplied from the 2D compressed data reception unit 35, and supplies 2D transform coefficient data acquired by the processing to the 2D decoding unit 37 and the 2D data rearrangement unit 52.

The 2D data rearrangement unit 52 sorts a plurality of pieces of 2D transform coefficient data supplied from the intermediate data generation unit 51 in a predetermined order, and supplies the sorted 2D transform coefficient data to the 3D transformation unit 53.

On the sorted 2D transform coefficient data supplied from the 2D data rearrangement unit 52, the 3D transformation unit 53 performs processing (3D transformation) for transforming into 3D transform coefficient data, quantization processing, and encoding processing. Further, the 3D transformation unit 53 supplies 3D compressed data acquired by the processing to the 3D compressed data storage unit 38.

The 2D decoding unit 37 performs inverse orthogonal transformation, or the like on the 2D transform coefficient data supplied from the intermediate data generation unit 51, and instructs the data display unit 33 to display a 2D image acquired by the processing.

The 3D decoding unit 39 reads and decodes the 3D compressed data stored in the 3D compressed data storage unit 38, and instructs the data display unit 33 to display a 3D image acquired by the processing.

Meanwhile, the server 12 specifies an image corresponding to the request of a certain image transmitted from the client terminal device 11, and provides the image to the client terminal device 11 via the transmission path 13.

The server 12 includes a request reception unit 61, a data specifying unit 62, a 3D compressed data storage unit 63, a 2D transformation unit 64, and a 2D compressed data transmission unit 65.

The request reception unit 61 receives a request transmitted from the client terminal device 11 via the transmission path 13, and supplies the request to the data specifying unit 62.

The data specifying unit 62 specifies image data to be transmitted to the client terminal device 11 based on the request supplied from the request reception unit 61. The data specifying unit 62 reads the 3D compressed data specified as the image data to be transmitted from the 3D compressed data storage unit 63, and supplies the data to the 2D transformation unit 64.

The 2D transformation unit 64 performs decoding processing and inverse quantization processing to the 3D compressed data supplied from the data specifying unit 62. The 2D transformation unit 64 performs processing (2D transformation) for transforming into 2D transform coefficient data, quantization processing, and encoding processing on the 3D transform coefficient data acquired by the decoding and inverse quantization processing. The 2D transformation unit 64 supplies 2D compressed data acquired by the processing to the 2D compressed data transmission unit 65.

The 2D compressed data transmission unit 65 transmits the 2D compressed data supplied from the 2D transformation unit 64 to the client terminal device 11 via the transmission path 13.

The image providing system 1 is configured such that the above-described processing can be performed.

<Configuration of Recompression Processing Unit>

Figure 2:
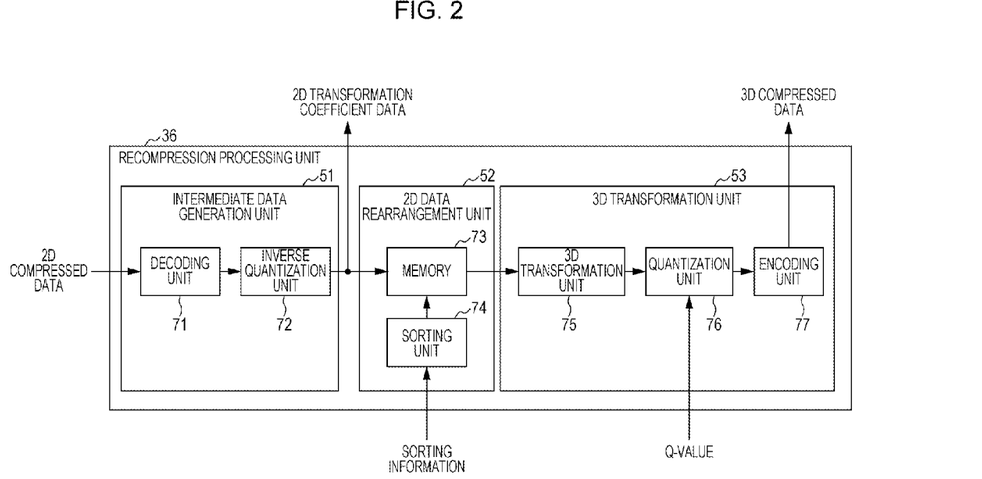
FIG. 2 illustrates a detailed configuration of a recompression processing unit.

FIG. 2 illustrates a detailed configuration of the recompression processing unit 36 in the client terminal device 11.

As described above, the recompression processing unit 36 includes the intermediate data generation unit 51, the 2D data rearrangement unit 52, and the 3D transformation unit 53.

The 2D compressed data received by the 2D compressed data reception unit 35 is supplied to the intermediate data generation unit 51. The intermediate data generation unit 51 includes a decoding unit 71 and an inverse quantization unit 72.

The decoding unit 71 decodes the 2D compressed data supplied from the 2D compressed data reception unit 35 using a decoding method corresponding to the encoding method for the encoding processing performed in the server 12. Further, the decoding unit 71 supplies quantized 2D transform coefficient data acquired by the processing to the inverse quantization unit 72.

The inverse quantization unit 72 performs inverse quantization processing on the quantized 2D transform coefficient data supplied from the decoding unit 71. Further, the inverse quantization unit 72 supplies the 2D transform coefficient data acquired by the processing to the 2D decoding unit 37 and the 2D data rearrangement unit 52.

The 2D data rearrangement unit 52 includes a memory 73 and a sorting unit 74.

The memory 73 sequentially stores the 2D transform coefficient data supplied from the inverse quantization unit 72.

The sorting unit 74 acquires information (hereinafter, referred to as sorting information) indicating an order of sorting the 2D transform coefficient data. Using the acquired sorting information, the sorting unit 74 sorts a plurality of pieces of 2D transform coefficient data stored in the memory 73 in the predetermined order to rearrange the 2D transform coefficient data.

The 3D transformation unit 53 includes a 3D transformation unit 75, a quantization unit 76, and an encoding unit 77.

On the 2D transform coefficient data rearranged on the memory 73, the 3D transformation unit 75 performs transformation (3D transformation) processing for transforming the 2D transform coefficient data into 3D transform coefficient data. Further, the 3D transformation unit 75 supplies 3D transform coefficient data acquired by the processing to the quantization unit 76.

The quantization unit 76 acquires a quantization value (hereinafter, referred to as Q-value) as a parameter for determining a compression rate. The quantization unit 76 quantizes the 3D transform coefficient data supplied from the 3D transformation unit 75 using the acquired Q-value, and supplies the data to the encoding unit 77.

The encoding unit 77 encodes the quantized 3D transform coefficient data supplied from the quantization unit 76 using an encoding method corresponding to the decoding method of the decoding processing performed in the server 12. Further, the encoding unit 77 supplies the 3D compressed data acquired by the processing to the 3D compressed data storage unit 38.

The recompression processing unit 36 is configured such that the above-described processing can be performed.

<Flow of Image Providing Processing>

Figure 3:
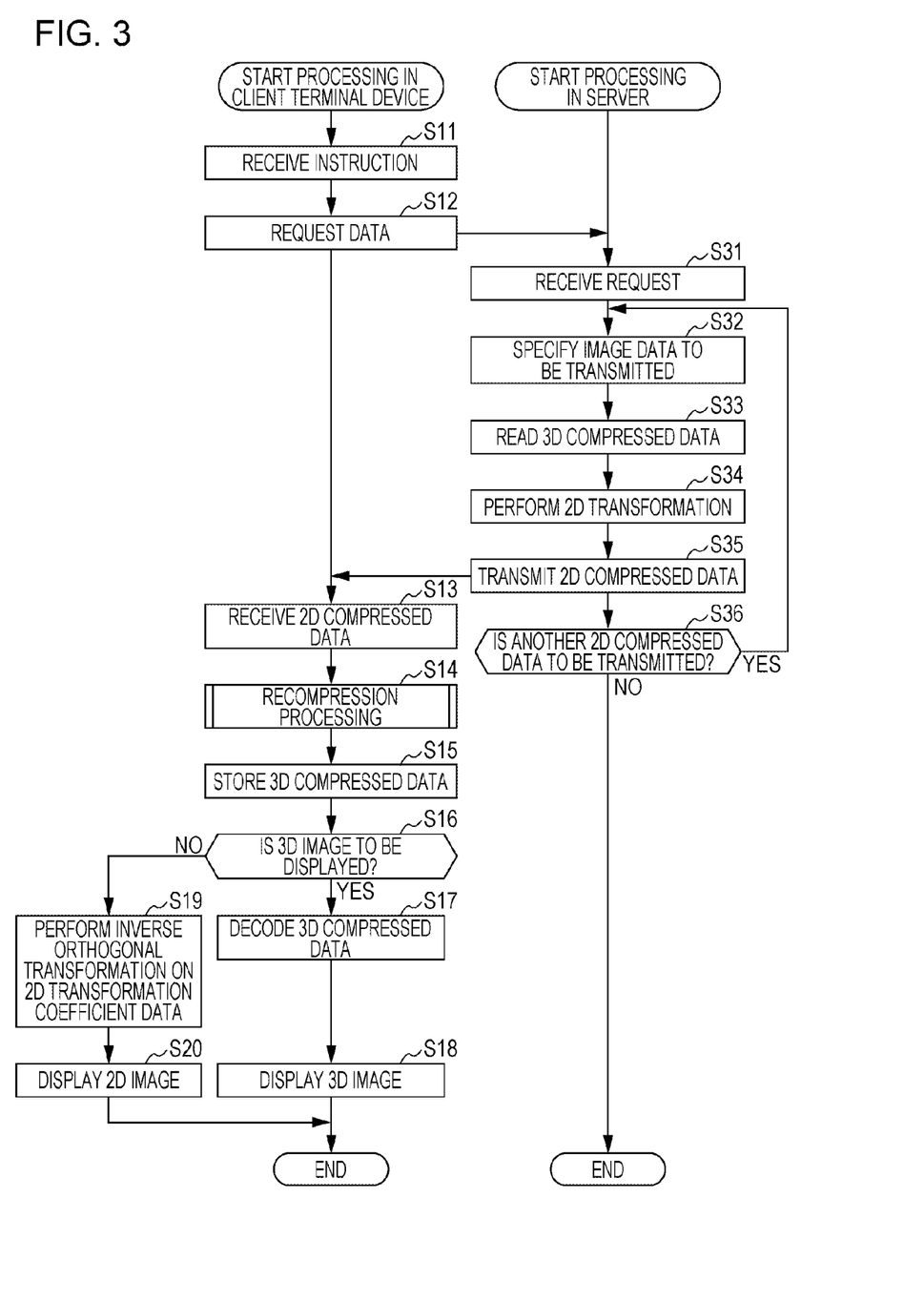
FIG. 3 is a flowchart illustrating image providing processing.

With reference to the flowchart in FIG. 3, image providing processing to be performed in the image providing system 1 is described.

In step S11, in the image providing system 1, the operation unit 32 receives an instruction relating to image display from the user with respect to an image displayed on the data display unit 33. For example, a position and a resolution of the image to be displayed are specified. If the instruction is issued, in step S12, the request transmission unit 34 requests image data corresponding to the instruction to the server 12 via the transmission path 13.

In step S31, in response to the transmission of the request from the client terminal device 11 via the transmission path 13, the server 12 receives the request with the request reception unit 61.

In step S32, the data specifying unit 62 specifies the image data to be transmitted to the client terminal device 11 based on the request acquired by the request reception unit 61. In step S33, the data specifying unit 62 reads the 3D compressed data specified as the image data to be transmitted from the 3D compressed data storage unit 63.

Figure 4:
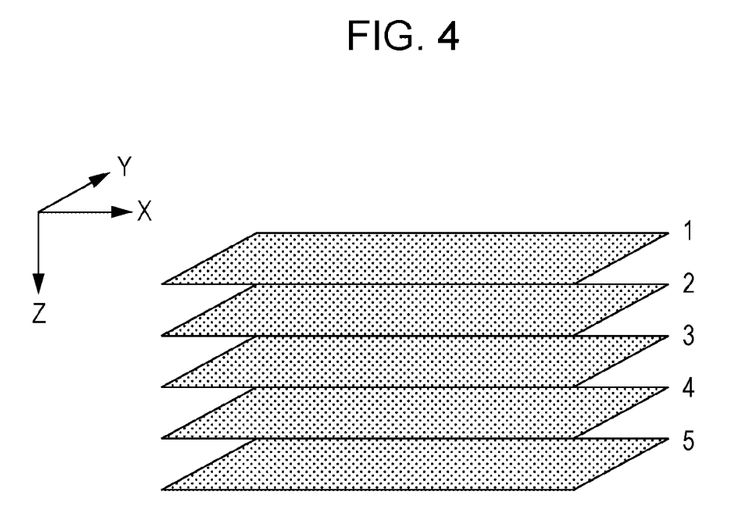
FIG. 4 illustrates an example of a configuration of 3D compressed data.

FIG. 4 illustrates an example of the configuration of the 3D compressed data.

As illustrated in FIG. 4, the 3D compressed data storage unit 63 stores frames corresponding to a plurality of 2D images as one set as the 3D compressed data. In the example illustrated in FIG. 4, five frames are grouped as one set. The 3D compressed data storage unit 63 stores many sets of such frame groups. For example, by capturing images of an object at a plurality of focal positions by changing Z coordinates of the focal positions, a plurality of captured images with respect to the one object are generated. The focal positions of the captured images are different with each other. The 3D compressed data generated by the captured images is stored in the 3D compressed data storage unit 63.

In the flowchart in FIG. 3, in step S34, the 2D transformation unit 64 transforms the 3D compressed data read from the 3D compressed data storage unit 63 into 2D compressed data.

Specifically, in the transformation processing, the 2D transformation unit 64 decodes the 3D compressed data, and performs inverse-quantization on the quantized 3D transform coefficient data acquired by the processing. As a result, 3D transform coefficient data is acquired. On the 3D transform coefficient data, the 2D transformation unit 64 performs processing (2D transformation) for transforming the 3D transform coefficient data into 2D transform coefficient data. The 2D transformation unit 64 further quantizes the 2D transform coefficient data acquired by the processing, and encodes the data using a predetermined encoding method, and thereby the 2D compressed data is acquired.

In the 2D transformation processing, for example, in a case where the 3D transform coefficient data is 3D-DCT coefficient data, a one-dimensional inverse discrete cosine transform (IDCT) is performed on the 3D-DCT coefficient data in the Z direction, and thereby 2D-DCT coefficient data can be obtained. In the encoding method, for example, a run-length Huffman encoding method is used to generate Joint Photographic Experts Group (JPEG) encoded data complying with the JPEG format as the 2D compressed data.

In step S35, the 2D compressed data transmission unit 65 transmits the 2D compressed data generated by the 2D transformation unit 64 to the client terminal device 11 via the transmission path 13.

In step S36, the data specifying unit 62 determines whether to transmit other pieces of 2D compressed data.

For example, if the band of the transmission path 13 or the processing power of the client terminal device 11 is enough, the server 12 can provide the client terminal device 11 with other pieces of 2D compressed data together with the 2D compressed data of the requested image. The other pieces of 2D compressed data includes, for example, peripheral 2D compressed data of the 2D compressed data adjacent in the Z direction.

For example, it is assumed that the user of the client terminal device 11 performs an observation of an object while seeing an image of the object displayed on the data display unit 33. On the data display unit 33, a whole image of the object can be displayed. Meanwhile, if the user wants to observe the image in detail, the image of the object can be enlarged such that a part of the image is displayed. The user, for example, changes the position of the potion to be displayed on the data display unit 33, change the focal position, or change the scaling ratio such that various images are displayed on the data display unit 33 to observe the object.

For example, in a case where the user observes different parts of a plurality of captured images (hereinafter, referred to as focus images), the user moves the parts of the focus images to be displayed on the data display unit 33 in the X direction or the Y direction. Further, for example, in a case where the user changes the focal position, the user changes the image to be displayed on the data display unit 33 in the z direction. Further, in a case where the user changes the scaling ratio of the display image, for example, in enlargement or reduction, the user changes the resolution of the image to be displayed on the data display unit 33.

The user can issue such instructions using any method. Generally, for example, the instructions are issued by graphical user interface (GUI) operation such as scrolling. Consequently, when the user controls the image to be displayed on the data display unit 33 as described above, an image at a position near the image currently being displayed is likely to be displayed next.

For example, an image in an area adjacent to the image currently being displayed on the same focus image (on the same XY plane) as the image currently being displayed, an image in the area of the same position as the image currently being displayed on a focus image adjacent in the Z direction to the focus image of the image currently being displayed, an image having a resolution different from the image currently being displayed corresponding to the image currently being displayed or the like is likely to be displayed next.

Consequently, the data specifying unit 62 in the server 12 transmits, in addition to the requested image, the 2D compressed data of peripheral images of the requested image to the client terminal device 11.

By the processing, the client terminal device 11 can acquire the image to be requested next before the request is issued. As a result, the client terminal device 11 can perform the image display processing without waiting for the response to the request. In other words, the response speed of the image display processing to the request can be increased.

In step S36, if the data specifying unit 62 determines to transmit other pieces of 2D compressed data, the processing returns to step S32. Then, the above-described processing in step S32 to S36 is repeated, and the 2D transform coefficient data including the requested image, and further, the other pieces of 2D transform coefficient data of the periphery of the data are specified, and the data is sequentially transmitted as the 2D compressed data to the client terminal device 11. In step S36, if the data specifying unit 62 determines not to transmit the other pieces of 2D compressed data, the processing in the server 12 ends.

In step S13, in response to the sequential transmission of the 2D compressed data from the server 12 via the transmission path 13, in the client terminal device 11, the 2D compressed data reception unit 35 sequentially receives the 2D compressed data.

In step S14, the recompression processing unit 36 performs recompression processing on the plurality of pieces of 2D compressed data acquired from the 2D compressed data reception unit 35. Detailed description of the recompression processing is described below with reference to the flowchart in FIG. 5.

In step S15, the 3D compressed data storage unit 38 stores the 3D compressed data acquired by the recompression processing by the recompression processing unit 36.

If it is determined that a 3D compressed image is to be displayed (YES in step S16), the processing proceeds to step S17. In step S17, the 3D decoding unit 39 reads the 3D compressed data stored in the 3D compressed data storage unit 38 and decodes the data. In step S18, the 3D decoding unit 39 instructs the data display unit 33 to display a 3D image acquired by the decoding processing.

If it is determined that a 2D compressed image is to be displayed (NO in step S16), the processing proceeds to step S19. In step S19, the 2D decoding unit 37 performs an inverse orthogonal transformation (for example, 2D inverse discrete cosine transform (IDCT)), or the like on 2D transform coefficient data acquired in the middle of the recompression processing by the recompression processing unit 36. In step S20, the 2D decoding unit 37 instructs the data display unit 33 to display a 2D image acquired by the inverse orthogonal transformation.

As described above, in the image providing system 1, the server 12 provides an image corresponding to a request from the client terminal device 11, and the client terminal device 11 displays the image. In the processing, in the client terminal device 11, the recompression processing is performed, the 2D compressed data provided from the server 12 is not fully decoded and the 2D transform coefficient data is generated as the intermediate data in the intermediate state in the decoding processing, and a 2D image or a 3D image based on the 2D transform coefficient data is displayed.

<Flow of Recompression Processing>

Figure 5:
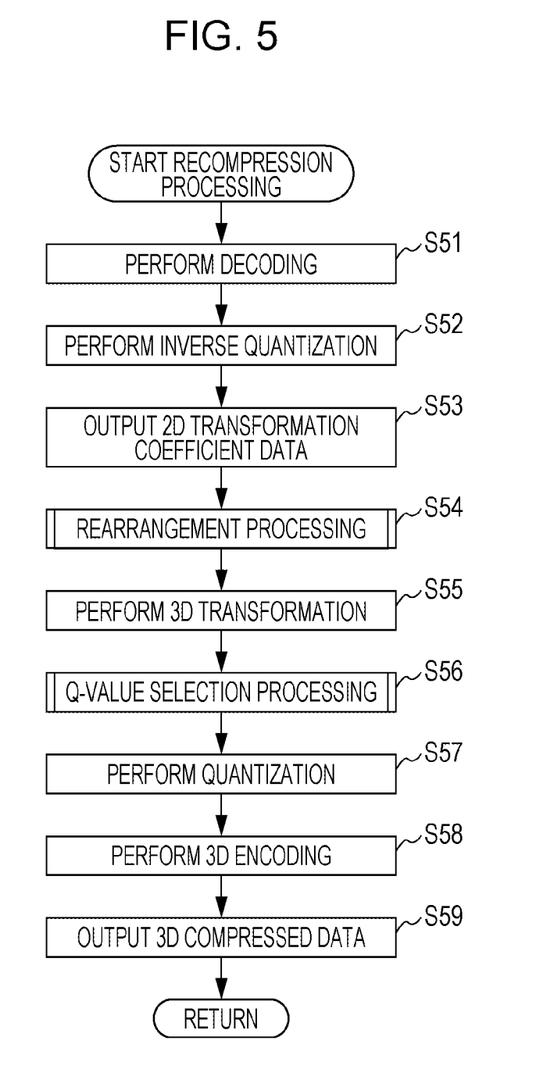
FIG. 5 is a flowchart illustrating recompression processing.

With reference to the flowchart in FIG. 5, recompression processing corresponding to the processing in step S14 in FIG. 3 is described in detail.

In step S51, the decoding unit 71 decodes the 2D compressed data acquired by the 2D compressed data reception unit 35.

In step S52, the inverse quantization unit 72 performs inverse quantization processing on the 2D transform coefficient data that is decoded and quantized by the decoding unit 71. In step S53, the inverse quantization unit 72 outputs the 2D transform coefficient data acquired by the inverse quantization processing to the 2D decoding unit 37. Following the processing, by the above-described processing in steps S19 and S20 (FIG. 3), the 2D image corresponding to the requested image is displayed on the data display unit 33.

In step S54, the 2D data rearrangement unit 52 performs rearrangement processing. With reference to the flowchart in FIG. 6, the rearrangement processing is described in detail.

Figure 6:
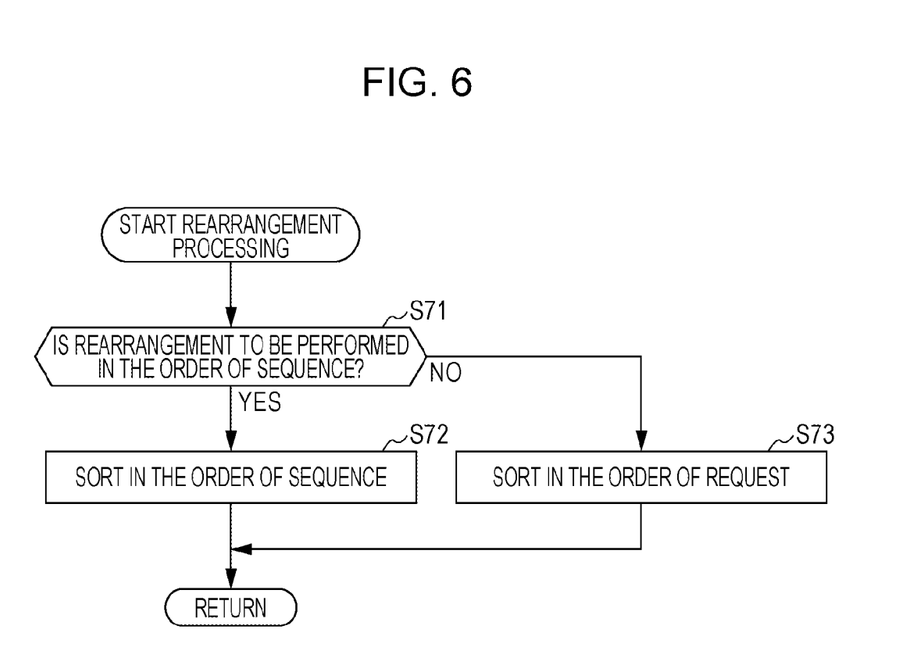
FIG. 6 is a flowchart illustrating rearrangement processing.

In step S71, the 2D data rearrangement unit 52 determines whether to rearrangement the 2D transform coefficient data in a sequence order.

Figure 7:
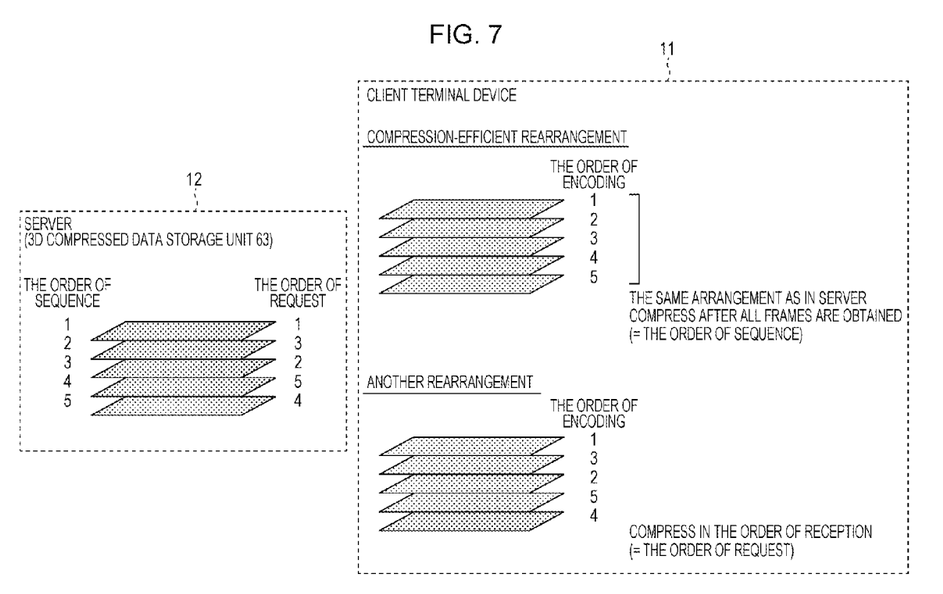
FIG. 7 illustrates orders of rearrangement.

With reference to FIG. 7, the order of rearrangement in the rearrangement processing is described.

As illustrated in FIG. 7, the 3D compressed data storage unit 63 in the server 12 stores many sets of images of frame groups. The client terminal device 11 sequentially acquires the frame groups belonging to a set. Then, the client terminal device 11 rearranges the sequentially acquired frames. The rearrangement order includes two types of orders; a sequence order and a request order.

The sequence order is an order of a plurality of frames in the 3D compressed data stored in the 3D compressed data storage unit 63 in the z direction. When the data is rearranged in the sequence order, the data is to be rearranged after all frame groups in a set are provided. Since the order of the frames is the same as the frames stored in the 3D compressed data storage unit 63, it is possible to obtain a compression rate similar to that of the frames stored in the 3D compressed data storage unit 63.

Figure 8:
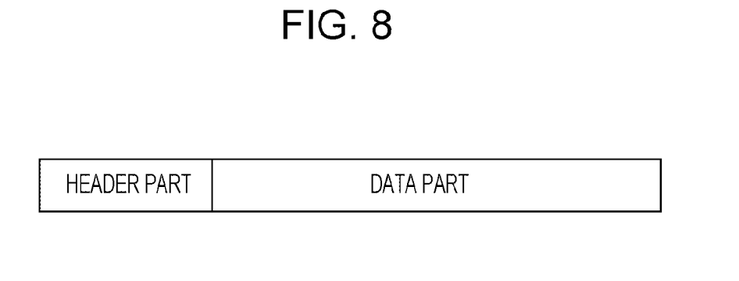
FIG. 8 illustrates an example of a format of transmission data.

As illustrated in FIG. 8, the information indicating the sequence order is described in the header part; each frame includes the header part and a data part. The 2D data rearrangement unit 52 acquires the information indicating the order of sequence described in the header part as sorting information. The information indicating the order of sequence may be specified not only by the header part, but, for example, may be specified by a system format corresponding to a predetermined method.

In FIG. 7, the request order is an order images are requested from the client terminal device 11. The information indicating the order of request may be, for example, an instruction relating to image display from a user. In the case of the request order, the order of the data is changed from the order in the 3D compressed data storage unit 63. Accordingly, the control unit 31 stores the instruction relating to image display from the user, and the information is acquired as the sorting information.

When the data is rearranged according to the request order, the data is to be rearranged in the order the user requested to the server 12. As a result, the compression rate may be decreased as compared to the compression rate of the data stored in the 3D compressed data storage unit 63. However, the sorting information can be managed at the side of the client terminal device 11, and consequently, the rearrangement processing can be surely performed.

In the flowchart in FIG. 6, in step S71, if it is determined that the data is to be rearranged in the sequence order, the processing proceeds to step S72. In step S72, the sorting unit 74 rearranges the 2D transform coefficient data stored in the memory 73 in the sequence order based on the sorting information.

In step S71, if it is determined that the data is not to be rearranged in the sequence order, the data is to be rearranged in the request order. Consequently, the processing proceeds to step S73. In step S73, the sorting unit 74 sorts the 2D transform coefficient data stored in the memory 73 in the request order based on the sorting information.

If the processing in step S72 or S73 ends, the processing returns to the flowchart in FIG. 5, and the processing after step S54 is performed.

In step S55, the 3D transformation unit 75 performs a 3D transformation processing on the 2D transform coefficient data that is rearranged on the memory 73. For example, if the 2D transform coefficient data is 2D-DCT coefficient data, the 3D transformation unit 75 reads the 2D-DCT coefficient data rearranged on the memory 73, and performs a one-dimensional discrete cosine transform (DCT) in the Z direction on the 2D-DCT coefficient data to generate 3D-DCT coefficient data.

In step S56, the quantization unit 76 performs Q-value selection processing. With reference to the flowchart in FIG. 9, the Q-value selection processing is described in detail.

Figure 9:
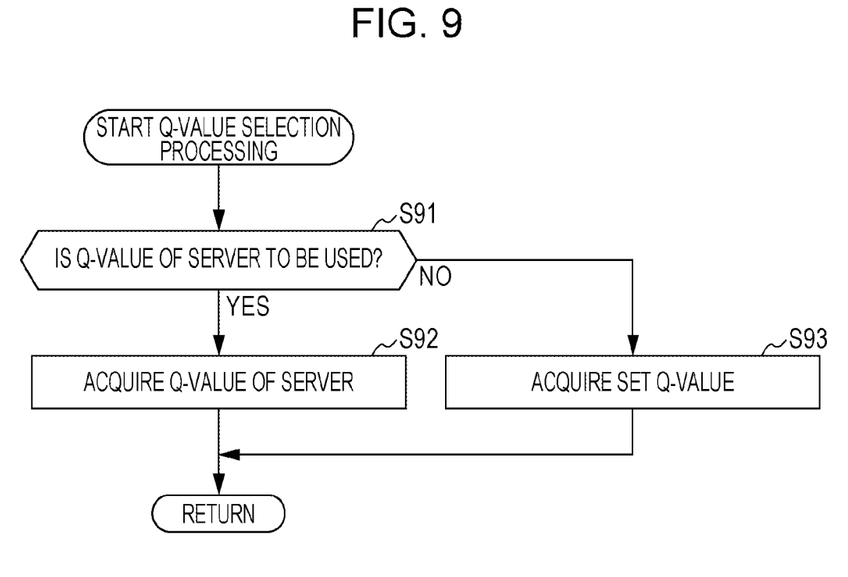
FIG. 9 is a flowchart illustrating Q-value selection processing.

In step S91, the quantization unit 76 determines whether to use a Q-value used in the server 12.

In step S91, if the quantization unit 76 determines to use the Q-value of the server 12, the processing proceeds to step S92. In step S92, the quantization unit 76 acquires the Q-value used in the encoding processing in the server 12.

As described above, the Q-value is a parameter for determining the compression rate. As the Q-value increases, the compression rate increases (low image quality), while as the Q-value decreases, the compression rate decreases (high image quality). The use of the Q-value used in the server 12 enables generation of the 3D compressed data having an image quality similar to that of the 3D compressed data stored in the 3D compressed data storage unit 63 and having a similar data amount. The Q-value in the server 12 is described in the header part in the frame illustrated in FIG. 8 or specified by a system format corresponding to a predetermined method. The Q-value is not limited to a constant value, but a whole Q-value table may be transmitted.

In step S91, if the quantization unit 76 determines not to use the Q-value of the server 12, the processing proceeds to step S93. In step S93, the quantization unit 76 acquires the Q-value set in the client terminal device 11. For example, the control unit 31 calculates a Q-value corresponding to the remaining capacity of the 3D compressed data storage unit 38, and supplies the Q-value to the quantization unit 76. In other words, in a case where the size of the 3D compressed data is too large and it is not possible to store the data due to a capacity limitation of the 3D compressed data storage unit 38 by the use of the Q-value of the server 12, the Q-value is set to a large value to decrease the image quality (reduce the size), and the data is stored.

If the processing in step S92 or S93 ends, the processing returns to the flowchart in FIG. 5, and the processing after step S56 is performed.

In step S57, the quantization unit 76 quantizes the 3D transform coefficient data transformed by the 3D transformation unit 75 using the acquired Q-value.

In step S58, the encoding unit 77 encodes the 3D transform coefficient data that is quantized by the quantization unit 76. In step S59, the encoding unit 77 outputs the 3D compressed data acquired by the encoding processing to the 3D compressed data storage unit 38. By the processing, the 3D compressed data is stored in the 3D compressed data storage unit 38.

As described above, in the recompression processing unit 36, the intermediate data generation unit 51 generates the 2D transform coefficient data as the intermediate data without fully decoding the 2D compressed data provided from the server 12, and using the 2D transform coefficient data, generates the 3D compressed data. Consequently, in the decoding processing to the intermediate data, the data can be recompressed to the 3D compressed data. As a result, as compared to a case where the data is fully decoded, the image quality deterioration can be reduced. In other words, in the case where the data is fully decoded, further transformation processing is to be performed. Consequently, as compared to the case the data is recompressed in the state the data is decoded to the intermediate data, the image quality is reduced.

Further, the recompression processing unit 36 can generate the 3D compressed data without fully decoding the 2D compressed data. Consequently, as compared to the case the 2D compressed data is fully decoded, the load in the transformation processing can be reduced. As a result, the processing can be performed at a high speed.

Further, the 2D data rearrangement unit 52 rearranges the data in the sequence order or in the request order, and performs the 3D transformation processing. Consequently, when the data is sorted in the sequence order, the data can have an image quality similar to that of the 3D compressed data stored in the server 12 and can be recompressed at a similar compression rate.

Further, the quantization processing can be performed using the Q-value used in the server 12. Consequently, the 3D compressed data having an image quality similar to that of the 3D compressed data stored in the 3D compressed data storage unit 12 and having a similar data amount can be obtained. Meanwhile, if the data storage capacity of the client terminal device 11 is not enough, the compression rate can be changed depending on the remaining capacity. Consequently, the 3D compressed data can be surely stored.

The data provided from the server 12 to the client terminal device 11 via the transmission path 13 is, 2D compressed data of a small data amount as compared to the 3D compressed data, for example, JPEG encoded data. Consequently, the data can be transmitted at a high speed.

In the description above, the discrete cosine transformation processing is described as an example of the orthogonal transformation processing. However, the processing is not limited to the above example, other orthogonal transformation processing, for example, a wavelet transformation may be performed. Further, in the description above, the JPEG encoded data is described as an example of the 2D compressed data provided from the server 12 to the client terminal device 11. However, for the encoding method of the image data to be provided to the client terminal device 11, any appropriate method may be employed. For example, the image data may be transformed into JPEG2000 encoded data and provided to the client terminal device 11.

<Description of Computer to which the Present Disclosure is Applied>

The series of processes described above may executed by hardware or by software. In a case where the series of processes is executed by software, a program constituting the software is installed on a general-purpose computer or the like.

Figure 10:
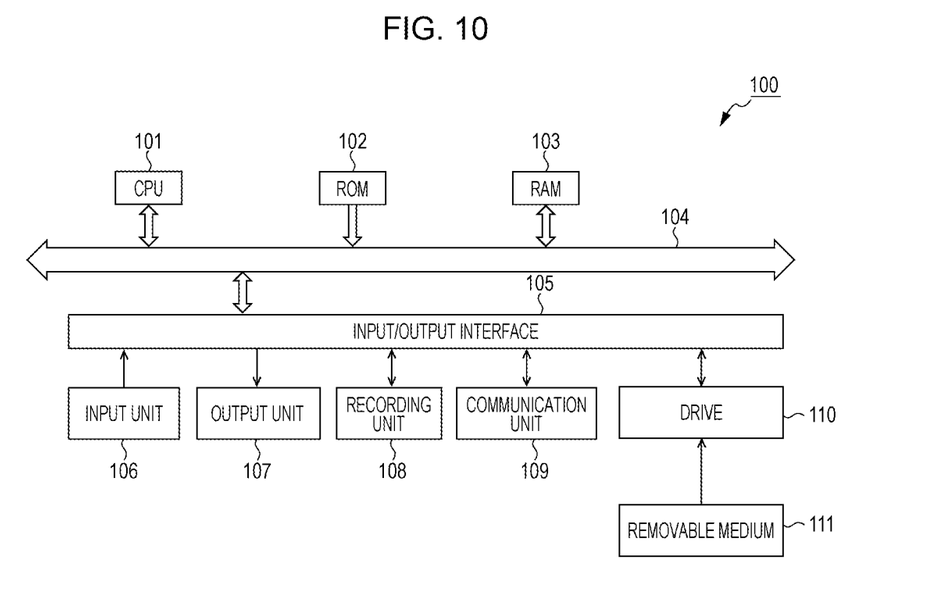
FIG. 10 illustrates an example of a configuration of a computer.

FIG. 10 illustrates an example of the configuration of the computer according to an embodiment in which the program implementing the above-described series of processes is installed.

The program may be recorded in advance in a recording unit 108 such as built-in hard disk in a computer 100 or a read-only memory (ROM) 102.

The program may be temporarily or permanently stored (recorded) in a removable medium 111 such as a flexible disk, a compact disc read-only memory (CD-ROM), a magnet-optical (MO) disk, a digital versatile disc (DVD), a magnetic disk, a semiconductor memory, or the like. Such a removable medium 111 may be provided as so-called packed software.

Instead of installing the program from the removable medium 111 to the computer 100, the program may be transferred to the computer 100 from a download site via a satellite for digital satellite broadcasting via wireless connection, or a wired network such as a local area network (LAN) or the Internet. The computer 100 can receive the program transferred in such a way with a communication unit 109, and install the program in the recording unit 108.

The computer 100 includes a central processing unit (CPU) 101. To the CPU 101, an input/output interface 105 is connected via a bus 104. In response to an instruction input by a user by operating an input/output unit 106 including a keyboard, a mouse, a microphone, or the like via the input/output interface 105, according to the instruction, the CPU 101 executes the program stored in the ROM 102. Alternatively, the CPU 101 loads the program stored in the recording unit 108, the program transferred from a satellite or a network, received by the communication unit 109, and installed in the recording unit 108, or the program read from the removable medium 111 attached to a drive 110 and installed in the recording unit 108, in a random access memory (RAM) 103, and executes the program. By the process, the CPU 101 implements the processing according to the above-described flowcharts, or the processing implemented by the configurations in the above-described block diagrams. Further, as necessary, for example, the CPU 101 outputs the processing result from an output unit 107 including an LCD, a speaker, or the like via the input/output interface 105, transmits the result from the communication unit 109, and further instructs the recording unit 108 to record the data.

The processing steps describing the program for instructing the computer 100 to perform various kinds of processing in the specification may not only be executed time-sequentially according to the order described as the flowcharts, but may be executed in parallel or individually (for example, parallel processing or processing by an object).

The program may be processed by a single computer or by a plurality of computers as distributed processing. Furthermore, the program may be transferred to a distant computer and executed by the computer.

In the specification, the term "system" means a set of plural apparatuses.

Furthermore, the embodiments of the present disclosure are not limited to the above-described embodiments, and it is to be understood that various changes may be made without departing from the spirit or scope of the present disclosure.

The present disclosure contains subject matter related to that disclosed in Japanese Priority Patent Application JP 2011-072379 filed in the Japan Patent Office on Mar. 29, 2011, the entire contents of which are hereby incorporated by reference.

What is claimed is:

1. An information processing apparatus comprising:
   a two-dimensional orthogonal transform coding data acquisition unit for sequentially acquiring two-dimensional orthogonal transform coding data acquired by transforming three-dimensional orthogonal transform coding data generated from a plurality of images;
   a two-dimensional orthogonal transform coefficient data generation unit for generating a plurality of pieces of two-dimensional orthogonal transform coefficient data using the plurality of pieces of acquired two-dimensional orthogonal transform coding data; and
   a three-dimensional transformation unit for encoding three-dimensional orthogonal transform coefficient data acquired by transforming the plurality of pieces of generated two-dimensional orthogonal transform coefficient data.

2. The information processing apparatus according to claim 1, further comprising:
   a two-dimensional orthogonal transform coefficient data rearrangement unit for sorting the plurality of pieces of generated two-dimensional orthogonal transform coefficient data in a predetermined order,
   wherein the three-dimensional transformation unit transforms the plurality of pieces of sorted two-dimensional orthogonal transform coefficient data into the three-dimensional orthogonal transform coefficient data.

3. The information processing apparatus according to claim 2, wherein the two-dimensional orthogonal transform coefficient data rearrangement unit sorts the plurality of pieces of two-dimensional orthogonal transform coefficient data into the same order as the arrangement order of the plurality of images.

4. The information processing apparatus according to claim 2, wherein the two-dimensional orthogonal transform coefficient data generation unit includes:
   a two-dimensional orthogonal transform coding data decoding unit for decoding each of the plurality of pieces of acquired two-dimensional orthogonal transform coding data; and
   an inverse quantization unit for performing inverse quantization processing on the decoded two-dimensional orthogonal transform coding data,
   wherein the two-dimensional orthogonal transform coefficient data rearrangement unit sorts the plurality of pieces of two-dimensional orthogonal transform coefficient data acquired by the inverse quantization processing.

5. The information processing apparatus according to claim 4, the three-dimensional transformation unit further comprising:
   a three-dimensional orthogonal transform coefficient data transformation unit for performing one-dimensional orthogonal transformation on the sorted two-dimensional orthogonal transform coefficient data in the direction the plurality of images are arranged, and transforming the data into three-dimensional orthogonal transform coefficient data;
   a quantization unit for quantizing the transformed three-dimensional orthogonal transform coefficient data; and
   a three-dimensional orthogonal transform coefficient data encoding unit for encoding the three-dimensional orthogonal transform coefficient data acquired by the quantization.

6. The information processing apparatus according to claim 5, further comprising:
   a three-dimensional orthogonal transform coding data storage unit for storing three-dimensional orthogonal transform coding data acquired by encoding the three-dimensional orthogonal transform coefficient data; and
   a three-dimensional decoding unit for decoding the stored three-dimensional orthogonal transform coding data.

7. The information processing apparatus according to claim 5, further comprising:
   a two-dimensional inverse orthogonal transformation unit for performing inverse orthogonal transformation processing on the two-dimensional orthogonal transform coefficient data acquired by performing the inverse quantization processing on the decoded two-dimensional orthogonal transform coding data.

8. The information processing apparatus according to claim 1, wherein the three-dimensional transformation unit encodes the three-dimensional orthogonal transform coefficient data using a quantization parameter.

9. The information processing apparatus according to claim 8, wherein the quantization parameter is a quantization value used in generating the three-dimensional orthogonal transform coding data from the plurality of images, or a quantization value corresponding to a capacity necessary for storing the three-dimensional orthogonal transform coding data acquired by encoding the three-dimensional orthogonal transform coefficient data.

10. The information processing apparatus according to claim 1, further comprising:
an image request unit for requesting an image,
wherein the two-dimensional orthogonal transform coding data acquisition unit sequentially acquires the two-dimensional orthogonal transform coding data containing an image corresponding to the request, and other two-dimensional orthogonal transform coding data on the periphery of the image.

11. An information processing method, wherein an information processing apparatus includes:
sequentially acquiring two-dimensional orthogonal transform coding data acquired by transforming three-dimensional orthogonal transform coding data generated from a plurality of images;
generating a plurality of pieces of two-dimensional orthogonal transform coefficient data using the plurality of pieces of acquired two-dimensional orthogonal transform coding data; and
encoding three-dimensional orthogonal transform coefficient data acquired by transforming the plurality of pieces of generated two-dimensional orthogonal transform coefficient data.

12. A non-transitory computer-readable storage medium having stored thereon, a computer program having at least one code section executable by a computer, thereby causing the computer to perform steps comprising:
sequentially acquiring two-dimensional orthogonal transform coding data acquired by transforming three-dimensional orthogonal transform coding data generated from a plurality of images;
generating a plurality of pieces of two-dimensional orthogonal transform coefficient data using the plurality of pieces of acquired two-dimensional orthogonal transform coding data; and
encoding three-dimensional orthogonal transform coefficient data acquired by transforming the plurality of pieces of generated two-dimensional orthogonal transform coefficient data.

13. An image providing system including an information processing apparatus, and an image providing apparatus for providing image data to the information processing apparatus,
wherein the image providing apparatus includes:
a three-dimensional orthogonal transform coding data storage unit for storing three-dimensional orthogonal transform coding data generated from a plurality of images;
a reading unit for reading an image corresponding to a request from the information processing apparatus and three-dimensional orthogonal transform coding data containing a peripheral image from the three-dimensional orthogonal transform coding data stored in the three-dimensional orthogonal transform coding data storage unit;
a two-dimensional orthogonal transform coding data transformation unit for transforming the read three-dimensional orthogonal transform coding data into the two-dimensional orthogonal transform coding data; and
a two-dimensional orthogonal transform coding data transmission unit for sequentially transmitting the transformed two-dimensional orthogonal transform coding data and other two-dimensional orthogonal transform coding data of the periphery of the image to the information processing apparatus, and
the information processing apparatus includes:
a two-dimensional orthogonal transform coding data reception unit for sequentially receiving the two-dimensional orthogonal transform coding data transmitted from the image providing apparatus;
a two-dimensional orthogonal transform coefficient data generation unit for generating a plurality of pieces of two-dimensional orthogonal transform coefficient data using the plurality of pieces of acquired two-dimensional orthogonal transform coding data; and
a three-dimensional transformation unit for encoding three-dimensional orthogonal transform coefficient data acquired by transforming the plurality of pieces of generated two-dimensional orthogonal transform coefficient data.

14. An image providing method for an image providing system including an information processing apparatus, and an image providing apparatus for providing image data to the information processing apparatus,
wherein the image providing apparatus includes:
reading three-dimensional orthogonal transform coding data containing an image corresponding to a request from the information processing apparatus and three-dimensional orthogonal transform coding data containing a peripheral image from a three-dimensional orthogonal transform coding data storage unit storing three-dimensional orthogonal transform coding data generated from the plurality of images;
transforming the read three-dimensional orthogonal transform coding data into the two-dimensional orthogonal transform coding data; and
sequentially transmitting the transformed two-dimensional orthogonal transform coding data and other two-dimensional orthogonal transform coding data of the periphery of the image to the information processing apparatus, and
the information processing apparatus includes:
sequentially receiving the two-dimensional orthogonal transform coding data transmitted from the image providing apparatus;
generating a plurality of pieces of two-dimensional orthogonal transform coefficient data using the plurality of pieces of acquired two-dimensional orthogonal transform coding data; and
encoding three-dimensional orthogonal transform coefficient data acquired by transforming the plurality of pieces of generated two-dimensional orthogonal transform coefficient data.

* * * * *